United States Patent [19]

Walker

[11] Patent Number: 4,529,452

[45] Date of Patent: Jul. 16, 1985

[54] PROCESS FOR FABRICATING MULTI-ALLOY COMPONENTS

[75] Inventor: Bryant H. Walker, Stuart, Fla.

[73] Assignee: United Technologies Corporation, Hartford, Conn.

[21] Appl. No.: 635,782

[22] Filed: Jul. 30, 1984

[51] Int. Cl.³ .................... B22F 5/04; B23P 15/04
[52] U.S. Cl. .................... 148/11.5 Q; 149/11.5 R; 149/11.5 P; 149/11.5 N; 149/12 R; 29/156.8 R; 29/156.8 CF; 29/DIG. 31; 420/902
[58] Field of Search .................. 148/11.5 R, 11.5 P, 148/12 R, 11.5 N, 11.5 Q; 420/902; 29/156.8 R, DIG. 31, 156.8 CF

[56] References Cited

U.S. PATENT DOCUMENTS

| | | | |
|---|---|---|---|
| 3,122,823 | 3/1964 | Lazar et al. | 29/156.8 R |
| 3,519,419 | 7/1970 | Gibson et al. | 420/902 |
| 4,081,295 | 3/1978 | Vogel | 148/11.5 N |
| 4,096,615 | 6/1978 | Cross | 29/156.8 R |
| 4,110,131 | 8/1978 | Gessinger | 148/11.5 N |
| 4,113,522 | 9/1978 | Hamilton et al. | 148/11.5 R |
| 4,270,256 | 6/1981 | Ewing | 29/156.8 R |
| 4,402,767 | 9/1983 | Hinze et al. | 148/11.5 P |
| 4,445,259 | 5/1984 | Ekbom | 29/156.8 B |
| 4,477,955 | 10/1984 | Becker et al. | 29/DIG. 31 |
| 4,481,047 | 11/1984 | Winfree et al. | 148/11.5 P |

Primary Examiner—Veronica O'Keefe
Attorney, Agent, or Firm—Stephen E. Revis

[57] ABSTRACT

A component, such as a turbine disk, made from a metal or metal alloy which has been processed to display superplastic properties at elevated temperatures, is diffusion bonded to a component or components, such as turbine blades, made from another metal or metal alloy, by disposing the components in a press with the surfaces to be bonded in mating contact. Moisture and oxygen are removed from between the surfaces. Heat and pressure are then applied, such as by forging at an elevated temperature or by hot isostatic pressing, to cause superplastic deformation of at least one of the components at the bonding surfaces. The heat and pressure are held sufficiently long to diffusion bond the surfaces. The new integral assembly is then heat treated to obtain desired properties. Consistently good diffusion bonds are achieved by this method.

20 Claims, 18 Drawing Figures

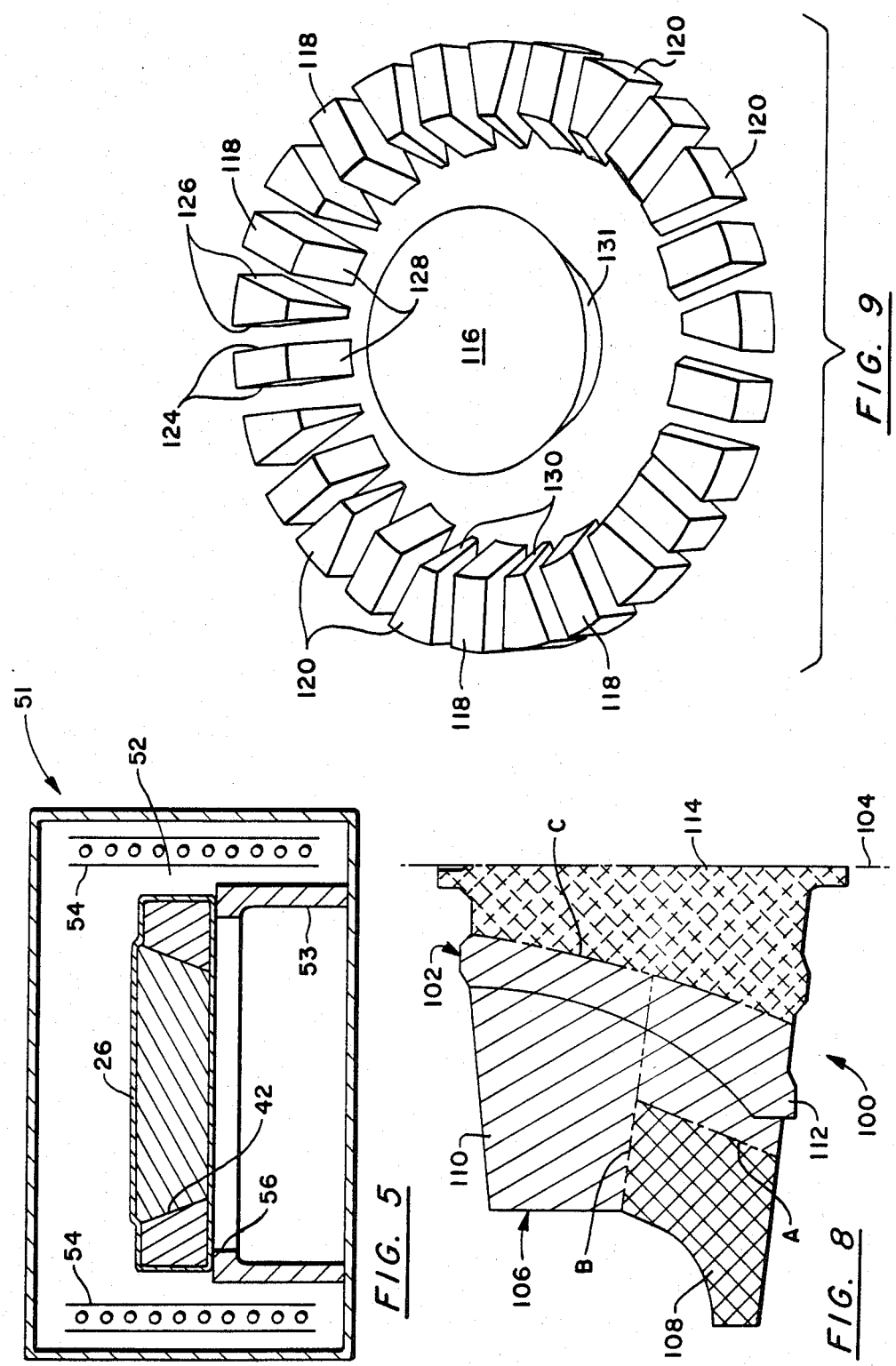

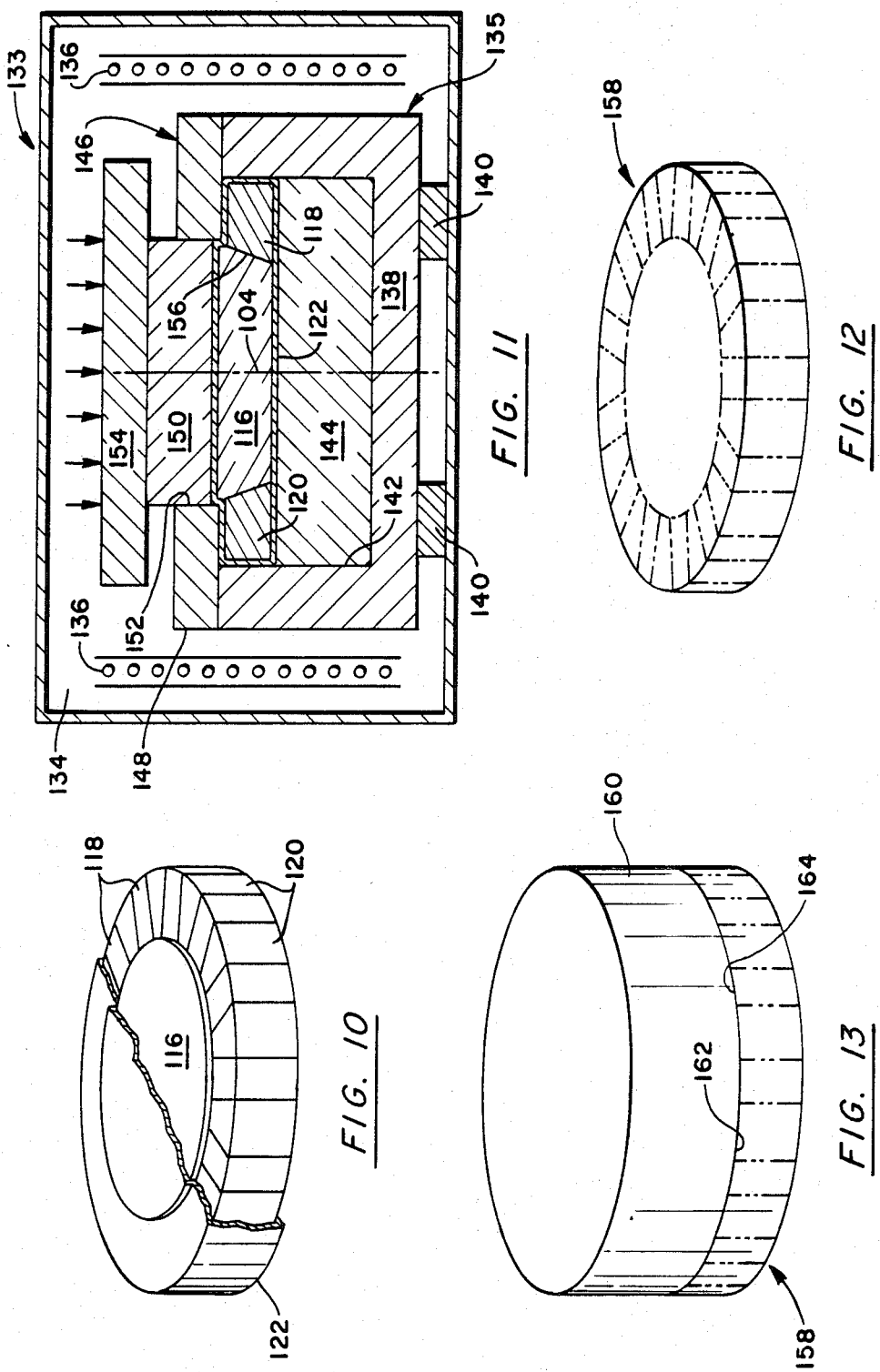

PROCESS FOR FABRICATING MULTI-ALLOY COMPONENTS

The Government has rights in this invention pursuant to contract number DAAK70-81-C-0127 awarded by the Department of the Army.

TECHNICAL FIELD

This invention relates to a fabrication process, and particularly to making integral, multi-alloy metallic components.

BACKGROUND ART

Rotors, such as for gas turbine engines and the like, are typically subjected to high stresses and high temperatures. Their design, construction, and the materials from which they are made often dictate operating limits for the apparatus in which they are employed. Extensive efforts have been made over the years to develop new alloys, new fabrication techniques, and new component designs which permit operation of these rotors at higher operating temperatures and/or which lead to lighter weight, longer lived components with all their attendant advantages.

The most common rotor design used today in high temperature, high speed applications, such as in gas turbine engines for jet aircraft, comprises a disk with blades or airfoils mechanically attached to the disk rim. The alloy used for the disk is selected to meet the requirements of high tensile strength and good low cycle fatigue resistance. Such properties are found in, for example, fine equiaxed grain superalloy material. The airfoils, which are exposed to the higher temperature of the gas path and greater centrifugal loads, are stress rupture and creep limited; thus, they are made from materials having good stress rupture and creep characteristics which are typical of coarser grained materials. No alloy processed to a singular microstructure could give optimum properties demanded by the conditions in both the disk section and the airfoils in advanced turbine engines without placing an extreme tax on either the designer's skill or the component weight. One piece, integral centrifugal rotors, such as radial inflow turbine rotors, pose similar problems.

There are many techniques disclosed in the prior art for fabricating integrally bladed rotors using different materials for the blades and the hub or disk. (The phrase "different material", as used in this specification and the claims, refers to materials having different properties but which may or may not have the same element composition. Thus, alloys having the same element composition and which are processed differently so as to exhibit properties different from each other are considered "different materials"). Two such techniques are described in U.S. Pat. Nos. 4,096,615 and 4,270,256. In both of those patents hot isostatic pressing is used to diffusion bond blades of one material to a disk of another material. Both patents recognize the difficulty in maintaining precise dimensional controls between adjacent airfoil components. Both include relatively complex procedures for forming an integral ring of blades. A radially inwardly facing surface of the ring is machined to a precise diameter to form a bonding surface adapted to mate with the radially outwardly facing bonding surface of a rotor disk made from a different material than the blades. The ring is positioned over the disk; and oxygen and other contaminants are removed from the bonding surfaces by vacuum outgasing, followed by sealing external joint lines with braze material. Hot isostatic pressing is then used to diffusion bond the blades to the disk.

Aside from the complexities involved in positioning the blades about the disk prior to hot isostatic pressing, as evidenced by the procedures involved in the above discussed U.S. Pat. Nos. 4,096,615 and 4,270,256 patents, an even more basic problem exists. Prior art diffusion bonding methods do not consistently result in wholly satisfactory solid state diffusion bonds. The bond will sometimes be very good, but under apparently identical conditions sometimes turn out totally unacceptable. Repeatability is missing. The present invention overcomes this significant shortcoming and also provides a relatively simple method for positioning blade elements about the disk in preparation for diffusion bonding.

In addition to the patents discussed above, Lazar et al, U.S. Pat. No. 3,122,823, uses conventional forging techniques to forge an integrally bladed rotor. A more recent development is the Gatorizing® isothermal forging method useful with high temperature superalloys as described in commonly owned U.S. Pat. No. 3,519,503, the teachings of which may be used in conjunction with commonly owned U.S. Pat. Nos. 4,074,559 and 4,265,105 which describe apparatus which may be used to forge integrally bladed rotors from superalloys. Other patents relevant to the fabrication of dual material rotors are: U.S. Pat. Nos. 2,479,039; 2,703,922; 2,894,318; 3,047,936; 3,598,169; 3,905,723; 4,051,585; 4,063,939; 4,097,276; and 4,175,911 (radial turbine wheel).

The state of the art for integrally bladed superalloy rotors is more fully described in a paper titled "Fabrication and Heat Treatment of a Nickle-Base Superalloy Integrally Bladed Rotor for Small Gas Turbine Applications" by Hughes, Anderson and Athey published on June 22, 1980 in *Modern Developments in Powder Metallurgy*—Volume 14 Special Materials, Published by Metal Powder Industries Federation. That paper discusses the fabrication of an integrally bladed rotor by the aforementioned Gatorizing process using a single superalloy throughout. Desired differences in properties between the airfoil and hub portion of the rotor are obtained by directionally recrystallizing the airfoils from their tips to a desired distance into the rim of the hub. The hub retains its fine equiaxed grains. This step is followed by further heat treatment cycles.

Better techniques for forming integrally bladed rotors having blades made from a different material than the disk are still needed.

DISCLOSURE OF INVENTION

An object of the present invention is a method for consistently obtaining a high quality solid state diffusion bond between the same or different materials.

Another object of the present invention is an improved process for fabricating integrally bladed rotors.

A further object of the present invention is an improved method for diffusion bonding blades to a disk of a different material than the blades.

Another object of the present invention is an improved method for solid state diffusion bonding a polycrystalline superalloy material to a single crystal superalloy of preferred crystallographic orientation.

Yet another object of the present invention is a process for fabricating an integral radial inflow turbine having impeller blades made from a material different from the disk and exducer blades.

According to the present invention a first metal component made from a material which has been fabricated such that it displays superplastic properties at elevated temperatures is diffusion bonded to another metal component by disposing the components in a press with their bonding surfaces in mating contact, and applying sufficient heat and pressure, simultaneously and for sufficient time to cause superplastic deformation of said first component at the bonding interface and a solid state diffusion bond between said components, and thereafter heat treating the bonded assembly to restore strength and hardness. The word "metal" as used in the specification and claims is intended to encompass metal alloys as well as pure metals.

According to a more specific aspect of the present invention, an integrally bladed bimetallic rotor is made by positioning individual blade elements in contact with and about the periphery of a disk preform, the disk preform material having been fabricated from a superalloy which becomes superplastic at elevated temperatures, and the blade element material having a predetermined desired crystallographic grain orientation. The disk preform with blade elements positioned therearound are disposed in a press, and heat and pressure of sufficient magnitude are applied for sufficient time to obtain both superplastic deformation of the disk preform where it interfaces with the blade elements and a solid state diffusion bond at that interface. Thereafter the assembly is heat treated to obtain strength and hardness. If the blade elements were not initially airfoil shaped, the airfoils could be machined from the material of the blade elements after diffusion bonding, either before or after heat treating.

An important aspect of the method of the present invention is the superplastic deformation at the bonding surface of one or both of the components being bonded together. This enhances the diffusion bonding process and greatly improves the likelihood that the diffusion bond will be acceptable.

The deforming pressure may be applied by isothermal forging under conditions described in commonly owned U.S. Pat. No. 3,519,503, which is known as the Gatorizing ® forging process and which patent is incorporated herein by reference. Hot isostatic pressure (HIP) may also be used to obtain superplastic deformation and diffusion bonding of the components. After the components have been diffusion bonded the assembly is heat treated by conventional techniques or otherwise to obtain the properties desired in the finished product.

As is well known in the art of diffusion bonding, the surfaces to be bonded together must be free from oxygen and other impurities during the diffusion bonding process. This may be accomplished by any known procedure, such as by placing the parts in a container, drawing a vacuum within the container, and then hot outgassing the container. Also, with some alloys made by powder metallurgy techniques, carbides from within the materials themselves migrate toward the free surfaces (i.e. the bonding surfaces) and form primary carbides at the temperatures at which diffusion bonding is typically practiced. These carbides can and often do prevent good diffusion bonding. In such cases, in accordance with the present invention, it is preferred to superplastically deform at the bonding interface at a temperature below that at which carbides can form, but within the superplastic temperature range of the material. After superplastic deformation has taken place there will be line-on-line contact at the bonding surfaces, and there is no longer any free surface on which carbides can form. The temperature may then be increased to that required to obtain solid state diffusion bonding within a reasonable length of time.

The process of the present invention is particularly well suited for fabricating bimetallic gas turbine engine turbine rotors. The disk material is preferably a fine grained wrought alloy which has been processed such that it displays superplastic properties at elevated temperatures. This material is formed into a disk preform. The blade elements are preferably blocks of blade material which have been directionally recrystallized or directionally solidified to a preferred crystallographic grain orientation. The blade elements may, for example, be fabricated as single crystal castings of the proper crystallographic orientation, or the grains may be columnar. The present invention is not intended to be limited to the use of single crystal or columnar grain blades.

Each blade element has a bonding surface adapted to mate with a raidally outwardly facing bonding surface of the disk preform. These bonding surfaces must be very clean and are preferably electropolished. A blade element for each blade of the rotor is accurately positioned about the periphery of the disk preform by any suitable means which maintains the proper orientation and relative position of the blade elements with respect to each other and to the disk preform during the bonding process. For example, each blade element may have opposed circumferentially facing surfaces which abut corresponding faces of adjacent blade elements such that when all blade elements are in position about the periphery of the disk preform they form a segmented full annulus. A cylindrical can of appropriate diameter may be used to hold all these blade elements and the disk preform in contacting relation during the bonding process. Prior to the application of pressure to the components, all oxygen and other contaminants such as moisture are removed from the surfaces to be bonded, and these surfaces are maintained contaminant free throughout the bonding process. For example, removal of contaminants may be accomplished by hot vacuum outgassing and sealing the can.

The evacuated can, with disk preform and blade elements therein, is placed with a press. The term "press" as used in this specification and appended claim, is intended to encompass any device for forcing the components together under very high pressure, such as apparatus for hot isostatically pressing the components or a forging press. The components are heated within the press to a temperature sufficient to put at least the disk preform in a superplastic condition. Sufficient pressure is then applied to the components to cause the disk preform to superplastically deform at its bonding surface to create line-on-line contact over the entire bonding surfaces of all the blade elements. A high pressure and temperature are held until a solid state diffusion bond is achieved. The blade elements, if single crystal or columnar, will not plastically deform during the diffusion bonding process and remain accurately positioned relative to each other and the disk preform throughout the diffusion bonding step. After diffusion bonding the integral blade and disk assembly is heat treated to obtain strength and desired properties in the disk and blades. Airfoils may be machined from each of the blade elements either before or after the heat treating process.

As will be more fully described hereinafter, the method of the present invention is also well suited to fabricating centrifugal rotors, such as radial inflow turbine rotors, made from two or more different materials.

The foregoing and other objects, features and advantages of the present invention will become more apparent in the light of the following detailed description of the preferred embodiments thereof.

BRIEF DESCRIPTION OF THE DRAWING

FIG. 5 is a cross-sectional view illustrative of hot isostatic pressing apparatus operating on the elements of FIG. 3 as an alternate method for bonding them together.

FIG. 8 is an illustrative cross-sectional view of the rotor of FIG. 7 taken through the centerline thereof.

FIG. 9 is an exploded view of impeller elements which are to be bonded together in a first phase of the fabrication of the rotor of FIG. 7.

FIG. 10 is a perspective view, partly broken away, of the impeller elements of FIG. 9 in position within an encapsulating can prior to bonding the elements together.

FIG. 11 is an illustrative cross-sectional view of a forging press operating upon the impeller elements of FIG. 9 within the can of FIG. 10.

FIG. 12 is a perspective view of the impeller elements of FIG. 9 after having been bonded together in the forging apparatus of FIG. 11.

FIG. 13 is a perspective view showing an exducer preform in position on the impeller elements of FIG. 12, prior to being bonded thereto.

BEST MODE FOR CARRYING OUT THE INVENTION

A. Fabricating an Axial Flow Rotor

Figure 1:
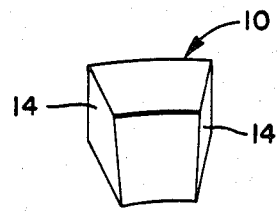
FIG. 1 is a perspective view of one of the blade elements which form the segmented annulus of FIG. 2.
Figure 2:
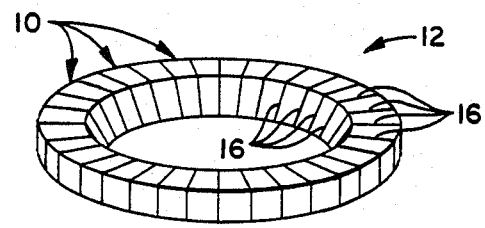
FIG. 2 is a perspective view of a segmented annulus formed of individual blade elements, which elements will be formed into rotor blades in a subsequent step of the process of the present invention.

In the fabrication of an axial flow rotor, such as the turbine of an axial flow gas turbine engine, blade elements having the desired crystallographic grain orientation are fabricated from a selected material having suitable strength and temperature properties. Superalloys are preferred and even required for state of the art gas turbine engines which have turbine inlet temperatures of above 2200° F. Superalloys, as that term is used herein, are nickel or cobalt base alloys with chromium, titanium, aluminum and refractory metal alloy additions. Nickel is the preferred base material. A separate blade element is fabricated for each blade of the rotor. One such element 10 is shown in FIG. 1. In this embodiment each element 10 is a block of nickel base superalloy which has been processed to produce a single crystal structure of the desired crystallographic orientation (for example, $<112>$ or $<111>$) so as to yield optimum blade mechanical properties for the particular rotor application and design. A plurality of these elements are positioned adjacent to one another in a circle to form a segmented annulus 12, as shown in FIG. 2. Each element 10 has a pair of oppositely and circumferentially facing bonding surfaces 14 which mate with corresponding surfaces of adjacent elements when formed into the configuration of the annulus 12. Although not the case in the embodiment shown, the blade elements could also be fabricated with passageways or channels therein which would be used for carrying cooling fluids therethrough in the finished product.

Figure 3:
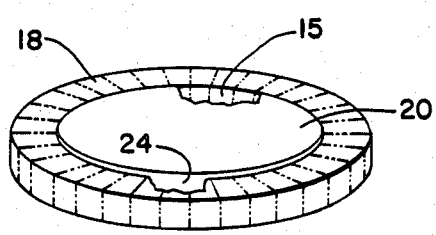
FIG. 3 is a perspective view showing the annulus of FIG. 2 positioned about a disk preform to which it is to be bonded.

The elements are then bonded to each other at their mating surfaces 14 by any suitable means which maintains the proper orientation of the elements 10 relative to each other, such as by hot isostatic pressing. Hot isostatic pressing creates diffusion bonds at the mating surfaces. As is well known in the art of diffusion bonding, the surfaces to be diffusion bonded should be oxygen and contaminant free, and maintained that way throughout the diffusion bonding process. This may be done, for example, by placing the unbonded annulus 12 within a chamber, outgassing the chamber, and then vacuum braze sealing all the joints 16 to prevent the re-entrance of contaminants. The assembly is then hot isostatically pressed to diffusion bond the surfaces. Alternatively, the entire unbonded annulus 12 may be encapsulated within a sealed can. The air is removed from the can, and the annulus 12 is then hot isostatically pressed. Temperatures on the order of 2000° F. and pressures on the order of 15,000 psi are typical for hot isostatic pressing. The pressure and temperature is held until a solid state diffusion bond is achieved. The annulus 12 is now a one piece integral blade ring 18 (FIG. 3). The radially inwardly facing surface 15 of the blade ring is accurately machined to an appropriate size and shape for the next step in the process.

The next step is to diffusion bond the blade ring to a disk preform of suitable material, which is preferably a wrought superalloy. A preferred material is AF2-IDA, a nickel base superalloy. Another possible material is IN-100, also a nickel base superalloy. The disk material is processed in accordance with the technique of hereinbefore mentioned U.S. Pat. No. 3,519,503 (incorporated herein by reference) so as to exhibit superplastic properties over a range of temperatures including those temperatures required for diffusion bonding the blade ring to the disk preform. As shown in FIG. 3, the integral blade ring 18 is positioned about the periphery of a disk preform 20 such that its radially inwardly facing bonding surface 15 mates with the radially outwardly facing bonding surface 24 of the disk preform 20. The assembly, comprising the disk preform 20 and the blade ring 18, is placed within a forging press 25 (shown schematically in FIG. 4) for purposes of superplastically deforming the preform and creating a solid state diffusion bond between the surfaces 15, 24. As in the process of fabricating the integral blade ring 18, the surfaces 15, 24 must be free from oxygen and other contaminants during the diffusion bonding process.

Figure 4:
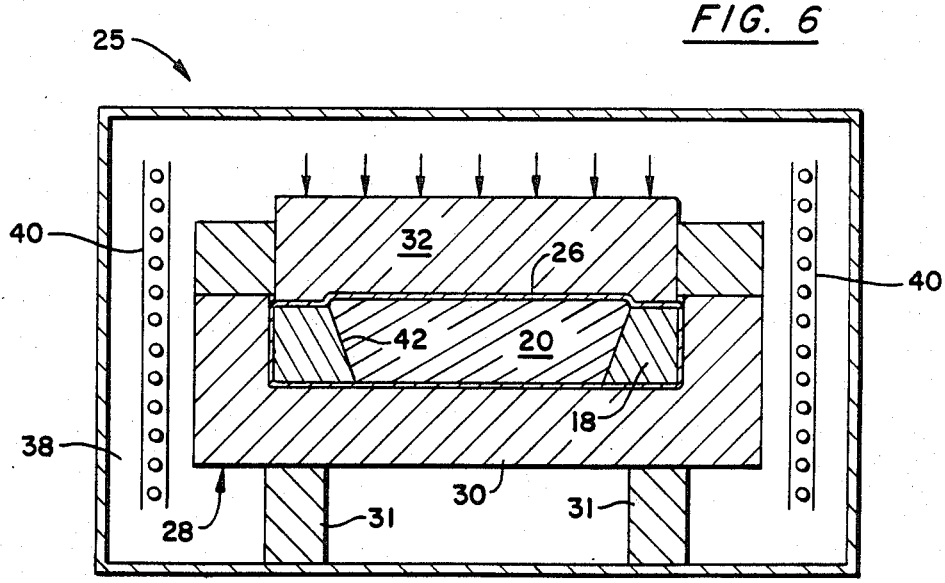
FIG. 4 is an illustrative cross-sectional view of a forging press operating upon the elements of FIG. 3 to bond them together.

In accordance with one embodiment of the present invention, which is illustrated in FIG. 4, the blade ring 18 and disk preform 20 are disposed within a can 26. A vacuum is drawn within the can, and the can is then heated and vacuum outgassed to remove additional potential contaminants. A vacuum of at least $5 \times 10^{-4}$ Torr is recommended, although at least $10^{-5}$ Torr is preferred. The high vacuum is necessary to assure the removal of virtually all oxygen molecules and other contaminants from the surfaces which are to be diffusion bonded. The can is then sealed. The sealed can 26 is disposed within forging tooling 28 of the forging press 25. The tooling 28 has a lower fixed die 30 and an upper moveable die 32. The lower die is held in position by supports 31. The forging tooling 28 is disposed within a chamber 38 of the press 25 and is surrounded by heating elements 40. The chamber 38 is evacuated to protect the dies from oxidation. The blade ring 18 and disc preform 20 are heated to a temperature sufficient to put the disk preform into a condition of superplasticity. For a material such as AF2-IDA, which does not have a carbide formation problem, this would be between 2025° and 2075° F. Since the blade ring 18 is made from single crystal material it will elastically, not plastically, deform during this step.

Once the required upset temperature is reached the upper die 32 is forced toward the lower die 30 using sufficient pressure such that, due to the superplastic nature of the disk preform 20, deforming of the preform material occurs at the bonding surface resulting in line-on-line contact over the entire bonding interface 42. In excess of a 5% upset (with respect to axial thickness of the preform) is preferred in this forging operation. Forging pressures of at least 15,000 psi are preferred. At that pressure the heated disk preform material acts like a fluid (i.e. superplastic deformation occurs). Pressures considerably less than 15,000 psi may be satisfactory, although 5000 psi pressure is known to be too low. After upsetting the preform the temperature is raised (if necessary) to the desired diffusion bonding temperature. The pressure is maintained at 15,000 psi or greater. The bonding pressure and temperature are held until a solid state diffusion bond is achieved at the interface 42. This may require two or more hours depending upon the materials, temperatures, and pressures used.

For most materials the upsetting temperature and desired diffusion bonding temperature are the same; however, for some powder metallurgy materials, such as IN-100, carbides tend to form at free surfaces at the preferred diffusion bonding temperature. In those cases it is preferred to upset the disk preform at a lower temperature within the superplastic temperature range below that temperature at which carbides form. For IN-100 the preferred upsetting temperature range is 1800° to 1850° F. After upsetting the temperature is raised to between 1975° and 2000° F.

Figure 6:
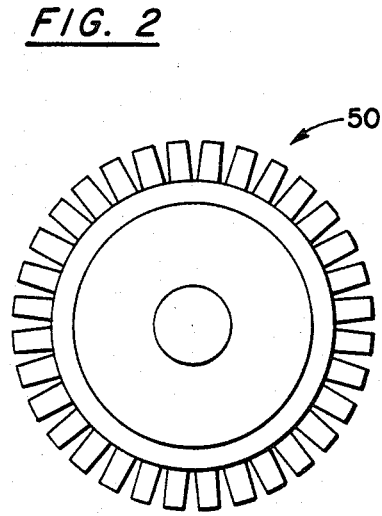
FIG. 6 is a front view of a finished integrally bladed bimetallic rotor made according to the process of the present invention.

The upset preform 20 (technically no longer a "preform" although still referred to as such in this application for ease of reference) and blade ring 18 are now an integral assembly. An airfoil is subsequently machined from each blade element 10 of the integral assembly. Further machining of the disk preform may also be done, if required. A finished rotor 50 is shown in FIG. 6. It will be appreciated that some shaping of the preform 20 may be accomplished during the forging/diffusion bonding step by using appropriately configured upper and lower dies 30, 32. It will also be appreciated that, in machining the airfoils, the diffusion bonded areas between adjacent blade elements 10 will be machined away leaving only single crystal airfoils of the appropriate crystallographic orientation integrally attached by solid state diffusion bonds to the rim of a wrought superalloy disk. Since the bonds between the blade elements 10 are only for the purpose of temporarily locating the elements 10 relative to each other during diffusion bonding of the blade ring to the disk preform 20, the integrity of those bonds is not critical. Techniques other than diffusion bonding may therefore be used to join the blade elements 10 into a ring 18.

After diffusion bonding the blade ring 18 to the disk preform 20, and before or after machining or otherwise forming airfoils in the blade ring, the integral assembly is heat treated to the desired strength and hardness for the disk preform and blade material. Recall that such material was degraded when the material was processed (to cause it to exhibit superplastic properties at elevated temperatures) and during the bonding operation.

An alternate method for diffusion bonding the blade ring 18 to the disk preform 20 is by hot isostatic pressing, such as was described in connection with diffusion bonding the blade elements 10 to each other to form the blade ring 18. As illustrated in FIG. 5, instead of putting the evacuated, sealed can 26 in a forging press 25, it is placed in a press 51 which includes a chamber 52 and heating coils 54. The can 26 rests on a support 53 having an annular cutout 56 therethrough. The parts to be bonded are first heated by coils 54 to temperatures previously discussed for the purpose of putting the disk preform material into a condition of superplasticity. The chamber 52 is then pressurized, for example, to 15,000 psi to obtain line-on-line contact at the interface 42. The pressure and a suitable diffusion bonding temperature is thereafter held until a solid state diffusion bond is attained through the process of hot isostatic pressing. The diffusion bonded integral assembly is thereafter machined and heat treated as required.

B. Fabricating A Radial Inflow Turbine Rotor

Figure 7:
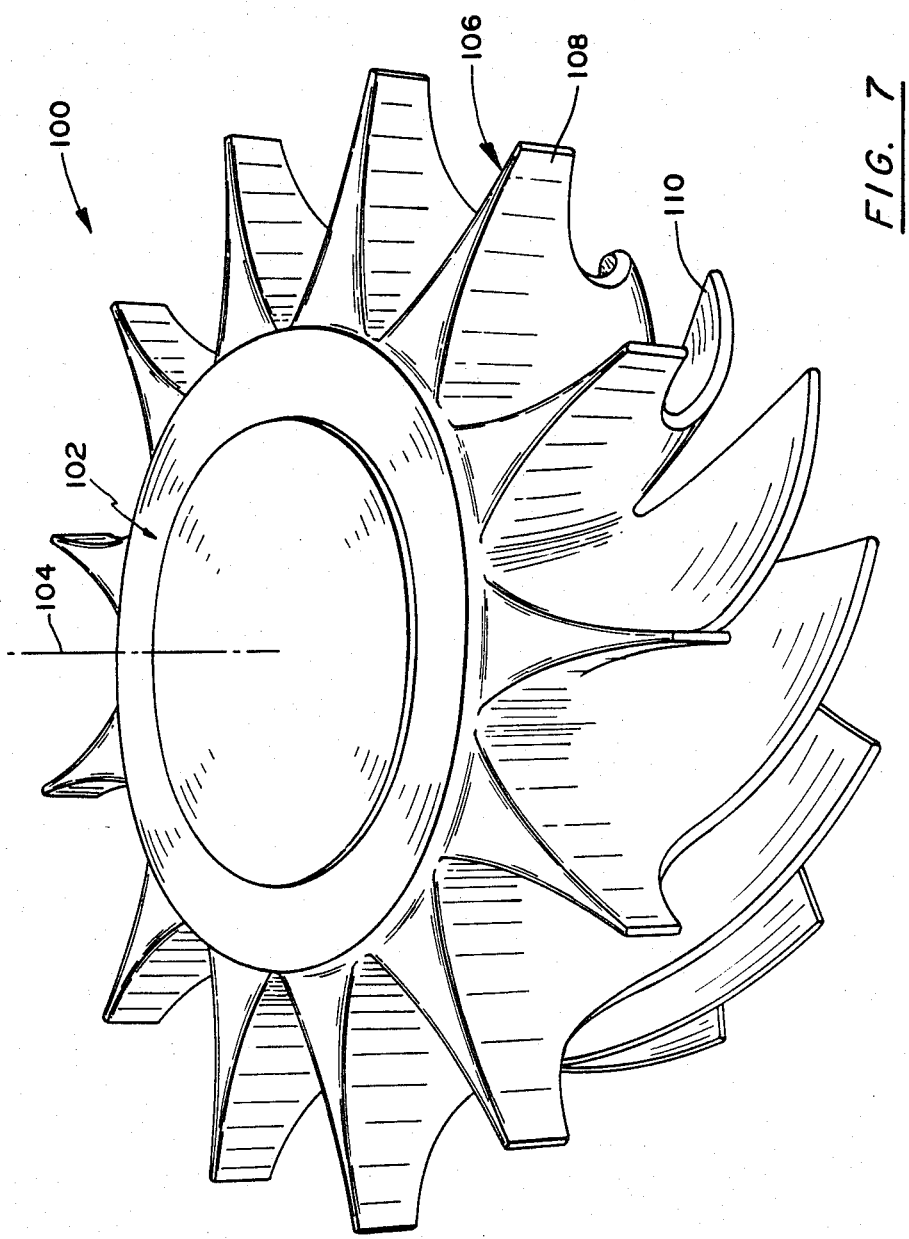
FIG. 7 is a perspective view of a radial inflow turbine rotor made in accordance with the teachings of the present invention.

A finished radial inflow turbine rotor which has been made in accordance with the teachings of the present invention is shown in FIG. 7 and is designated by the reference numeral 100. In this exemplary embodiment the rotor is about 3.5 inches thick at its center and has a maximum diameter of 5.8 inches. The rotor 100 comprises a disk 102 having an axis 104. A plurality of circumferentially spaced apart blades, generally represented by the reference numeral 106, extend radially outwardly from and are integral with the disk 102. The blades 106 each comprise an impeller portion 108 and an exducer portion 110. The exducer portion 110 is integral with the impeller portion 108. To maximize life expectancy it is desirable that different portions of the rotor 100 be made from different materials; that is, materials having different properties. In FIG. 8 the rotor 100 is shown in a cross section taken through its axis. The portions of the rotor having the same properties are identically crosshatched. The exducer blades 110 are subjected to moderately high temperatures and relatively high stresses and require coarse grain creep resistance and rupture resistance. The impeller blades 108 are subjected to high temperatures and stresses and are preferably made from a single crystal material. The disk 102 preferably comprises an outer hub ring 112, to which the impeller blades and exducer blades are attached, and an inner core 114. The hub ring is preferably but is not necessarily made from the same material as the exducer blades. The core of the disk 102 is subjected to lower temperatures and higher stresses thereby preferably being made from a fine grain polycrystalline material having good tensile strength and low cycle fatigue resistance.

The rotor 100 was fabricated in three separate bonding operations which resulted in the diffusion bonding interfaces A, B and C shown in phantom in FIG. 8. FIG. 9 shows the components for bond A in an exploded view. The components comprise an impeller disk preform 116, a plurality of impeller elements 118, and a plurality of spacer blocks 120. The spacer blocks 120 are used to position and orient the blade elements accurately relative to each other and the preform 116. In this embodiment the impeller disk preform 116 was a fine grained nickel base superalloy designated AF2-1DA, which was processed such that it would become superplastic at elevated temperatures. The impeller blade elements 118 were made from a single crystal nickel/chrome/aluminum base alloy having a <110> crystallographic grain orientation. These blade elements were made from a powder metallurgy product. They may also be cast, but it is difficult to obtain preferred crystallographic grain orientation in a casting process. The spacer blocks 120 were made from a coarse grained cast nickel base superalloy having the designation Astroloy.

As best shown in FIG. 10, in a manner analogous to the method described above, for producing the axial flow rotor, the components were placed in a can 122, which in this instance was made from Inconel 625, a nickel base alloy. The impeller elements 118 and spacer blocks 120 were alternately positioned about the periphery of the impeller disk preform 116. Circumferentially facing opposed surfaces 124 (FIG. 9) mate with the opposed circumferentially facing surfaces 126 of the adjacent spacer blocks 120 thereby defining an unbonded, segmented annulus. The radially inwardly facing surfaces 128, 130 of the blade elements 118 and spacer blocks 120, respectively, evacuated to $10^{-5}$ Torr and also hot vacuum outgassed to remove all oxygen and contaminants from the surfaces which are to be bonded. The can ws then sealed.

Turning to FIG. 11, in a manner similar to the method described above in connection with the fabrication of an axial flow rotor, the sealed can was placed within a forging press 133 comprising a vacuum chamber 134 and forging tooling 135. The tooling, with the can 122 disposed therein, is surrounded by heater coils 136. The forging tooling 135 comprised a stationary lower die 138 secured to a support 140. The lower die 138 included a cylindrical cavity 142 within which was disposed a cylindrical filter block 144; and disposed on top of the filler block was the can 122. An upper die 146, comprising a stationary annular outer die portion 148, was positioned above the spacer blocks 120 and the impeller blade elements 118. The upper die 146 also included an axially moveable cylindrical center portion 150 disposed within a cylindrical opening 152 in the outer die portion 148 and aligned with the impeller disk preform 116. A ram 154 moves the central die portion 150 into the workpiece.

The can 122 and its contents, as well as the forging dies and filler block 144 were heated to a temperature (about 2050° F.) sufficient to put the impeller disk preform 116 into a condition of superplasticity. Once this temperature was reached the moveable die 150 was forced against the can 122 to upset the disk preform by about 10% in the axial direction, the amount of upset being selected to assure line-on-line contact over the entire bonding interface 156 (bond interface A in FIG. 8) between the disk preform 116 and the spacer blocks and blade elements 120, 118, respectively. As shown in FIG. 11, prior to forging, the axial thickness of the impeller disk preform 116 was greater than the axial thickness of the spacer blocks or blade elements. In this instance the forging step reduced the original thickness of the disk preform to approximately that of the spacer blocks and blade elements. A forging pressure of about 15,000 psi was used.

After upsetting the preform by forging, the temperature was held at about 2050° F. and the pressure was held at 15,000 psi until a solid state diffusion bond was achieved at the interfaces between the impeller disk preform and the blade elements. For the materials of this example, the pressure and temperature were held for about two hours. It should be noted that neither the spacer block material nor the blade element material used in this example exhibit superplastic properties during the bonding operation. Therefore, those materials did not deform during the forging and bonding steps and remained accurately positioned throughout such steps. FIG. 12 shows the forged, bonded impeller blade ring assembly (herein designated by the reference numeral 158) after the can 122 is machined off of all surfaces. It should be noted that only the diffusion bonds between the blade elements 118 and the impeller disk preform 116 are critical since the spacer block 120 will eventually be machined away when the impeller blades are formed in a subsequent step. For this reason a relatively inexpensive material is selected for the spacer blocks. Alternatively to the procedure just described, the integral impeller disk assembly 158 may be fabricated by the method described in Section A of this specification for fabricating an axial flow turbine, which procedure did not utilize spacer blocks. Conversely, the method of this Section B may be used to fabricate an axial flow turbine, and is actually preferable for two reasons: It eliminates a separate diffusion bonding step and reduces cost by replacing expensive blade material with less expensive spacer material.

Figure 14:
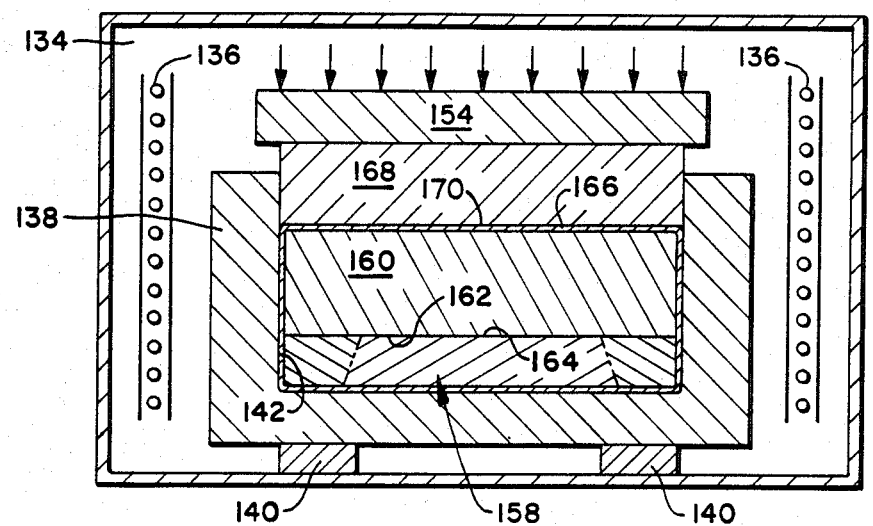
FIG. 14 is an illustrative cross-sectional view of a forging press operating on the components of FIG. 13 to bond them together.

Referring to FIG. 13, the next step in the process invovles bonding a cylindrical exducer disc preform 160, having a flat circular surface 162, to the impeller blade ring assembly 158. In this case, although not mandatory, the exducer disk preform 160 was made from the same material as the impeller disk preform; that is AF2-1DA which had been processed to exhibit superplastic properties at elevated temperatures. The exducer disk preform 160 and impeller blade ring assembly 158 were disposed in a can 166 (FIG. 14) with the preform 160 atop the assembly 158 such that the surface 162 was flat against the surface 164. The can was then evacuated and hot vacuum outgassed. The evacuated can 166 and its contents was disposed within the cavity 142 of the lower stationary forging die 138 used previously, the filler block 144 having been removed.

Once again, all of the elements were heated to above the superplastic temperature (about 2050° F.) of the exducer disk preform material; and the ram 154 was moved downwardly forcing an upper die 168 against the entire upper circular surface 170 of the can 166 upsetting the exducer disk preform 160 to create line-on-line contact between the mating surfaces 162, 164. The temperature was thereafter held at 2050° F. and the pressure maintained at about 15,000 psi for a period of about two hours until a solid state diffusion bond was formed across the entire interface between the exducer disk preform 160 and the impeller blade ring assembly 158. This is the bond interface B shown in FIG. 8. This new assembly is hereinafter referred to as the impeller-/exducer assembly 169. It should be noted that the bond between the spacer blocks 120 and the exducer disk preform 160 is not critical since the spacer blocks will eventually be machined away forming the finished rotor. The can 166 was machined away prior to the next step in the process.

In this exemplary embodiment the impeller/exducer assembly 169 was heated to a temperature above the gamma prime solvus of AF2-1DA. This heat treatment coarsened the grain structure of that material to restore its strength and hardness. Recall that the spacer material is already a coarse grained material which does not exhibit superplastic properties at elevated temperatures. Also the blade element material, being single crystal, does not exhibit superplastic properties.

Figure 15:
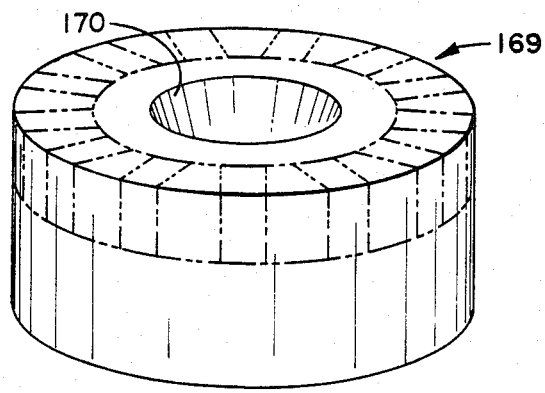
FIG. 15 is a perspective view of the components of FIG. 13 after they have been bonded together and with a core cavity machined therein.
Figure 16:
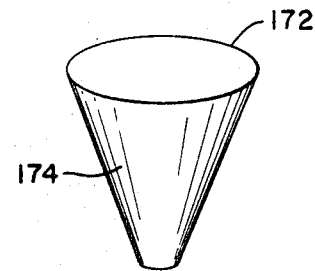
FIG. 16 is a perspective view of a core element which is to be inserted into and bonded to the integral assembly shown in FIG. 15.
Figure 17:
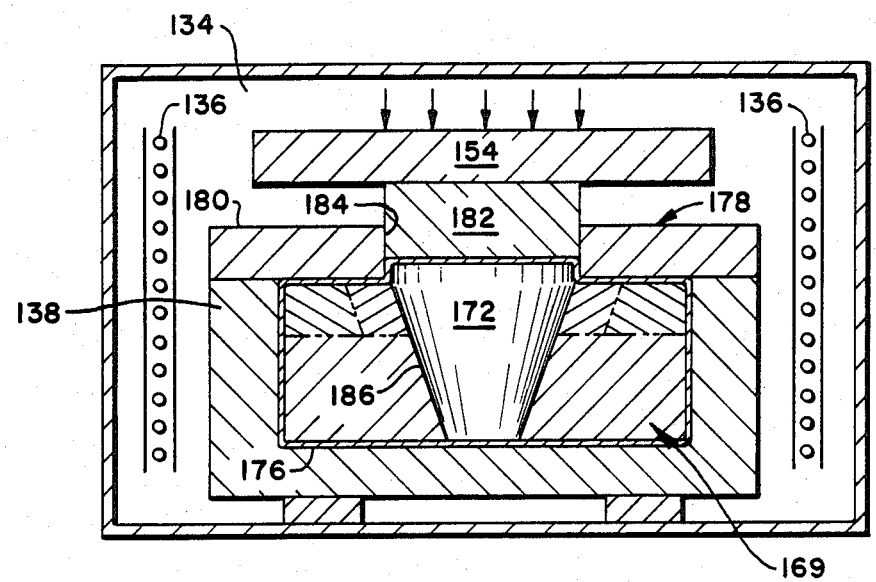
FIG. 17 is an illustrative cross-sectional view of a forging press operating on the integral assembly of FIG. 15 with the core element of FIG. 16 inserted therein.
Figure 18:
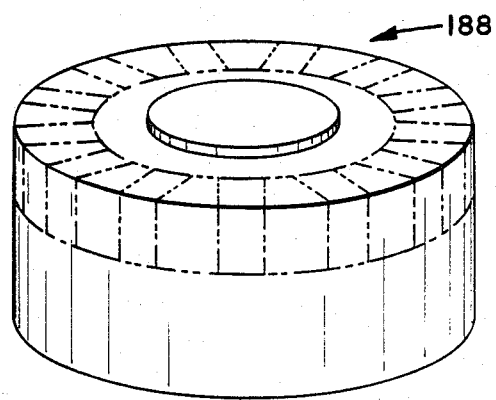
FIG. 18 is a perspective view of the rotor assembly of FIG. 15 after the core element of FIG. 16 has been bonded within a central cavity thereof.

As discussed above, it is desired that the finished rotor have a core which exhibits high tensile strength and low cycle fatigue resistence. Referring to FIG. 15, a cone shaped hole 170 was machined through the center of the impeller/exducer assembly 169. A core preform 172, best shown in FIG. 16, was fabricated having the same shape as the hole 170 and having an external concial surface 174 which, when disposed within the hole 170, mated with the conical surface thereof. In this example the core preform 172 was made from AF2-1DA fine grained material which had been processed to exhibit superplastic properties at elevated temperatures. As in previous steps, and as best shown in FIG. 17, the assembly 160 with the core preform 172 disposed within the hole 170 was encapsulated within a can 176. Air and other contaminants were withdrawm from the can under high vacuum of at least $10^{-5}$ Torr. The can was sealed and placed within forging tooling 178 disposed within the vacuum chamber 134. The lower stationary forging die 138 was the same as in the previous forging-/diffusion bonding steps. The upper die comprised a stationary outer portion 180 and a moveable inner portion 182 which moves axially within an opening 184 within the stationary outer die portion 180. Note that the axial height of the core preform 172 is greater than the height of the assembly 169. A solid state diffusion bond at the interface 186 between the core preform 172 and assembly 169 (bond interface C in FIG. 8) was accomplished in the same manner as described above with respect to the diffusion bonds A and B. That is, the components were heated to a temperature (about 2050° F.) wherein the fine grained material of the core preform 172 became superplastic. The moveable portion 182 of the upper die was then forced against the can 176 and the upper surface of the core preform 172 to upset the core preform 172 by at least 5% in the axial direction thereby creating line-on-line contact at the interface 186. A forging pressure of about 15,000 psi was used. The pressure and temperature was held for a sufficient time to result in a solid state diffusion bond at the interface 186. The can 176 and its contents was removed from the press, and the can material was machined away leaving an unfinished rotor assembly 188 depicted in FIG. 18. The rotor assembly 188 was heat treated at a temperature below the gamma prim solvus temperature of the core preform 172 so as to coarsen the grain size slightly (but to a lesser extent than the surrounding exducer disk and impeller disk material) and to stabilize the carbides. Subsequently an aging heat treatment was conducted to give the entire assembly optimum strength at its expected operating temperatures and conditions.

The part was then final machined to the configuration of FIG. 7. No spacer block material remained. The major radial extent of the impeller blades 108 was single crystal material having a preferred crystallographic grain orientation. The exducer blades 110 were cut from what was originally the exducer disk preform material and are integral with the impeller blades 108 via the solid state diffusion bond B of FIG. 8. The radially innermost ends of the impeller blades 108 were integral with the material of the impeller disk preform 112 via the diffusion bond A.

Although in the preceeding example the method for making the centrifugal rotor involved three separate bonding operations, the actual number of bonding operations and the shape of the components used in each step will be dictated by many considerations, including the desired final rotor shape, the materials used, the required physical properties of the rotor, and manufacturing costs. For example, it may be possible to reduce costs by combining the first two bonding operations (bonds A and B) of the preceding example. Die and preform configurations would probably have to be somewhat modified.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A method for joining a first element made from a first superalloy material to a second element made from a metal which is a different material from said first material, including the steps of:

processing said first material such that it exhibits the property of becoming superplastic during the subsequent step of heating and applying pressure, and fabricating said first element from said processed first material, said first element having a bonding surface, said second element also having a bonding surface adapted to mate with the bonding surface of the first element;

positioning said first and second elements within a press such that their bonding surfaces are in mating contact; and heating said first and second elements within said press and simultaneously applying pressure thereto to obtain (1) superplastic deformation of said first element at its bonding surface where it mates with the bonding surface of said second element to create line-on-line contact over said surface and (2) a solid state diffusion bond at said mating surfaces to form an integral assembly.

2. The method according to claim 1 wherein said step of positioning comprises positioning said elements within a forging press, and said step of heating and applying pressure comprises forging under isothermal conditions to obtain said superplastic deformation.

3. The method according to claim 1 wherein said step of positioning includes encapsulating said elements within a can, evacuating the air from said can, and positioning said evacuated can with said press.

4. In a method for fabricating an integrally bladed rotor having blades made from a first material of a metal having a predetermined desired crystallographic grain orientation, said blades being integral with a disk made from a superalloy having different properties from said first material, wherein said blades are bonded directly to the rim of said disk, including the steps of:

fabricating a disk preform by processing said superalloy disk material such that said preform has the property that it becomes superplastic at elevated temperatures, including forming a radially outwardly facing first bonding surface on said preform;

fabricating individual blade elements of said first material, each having said desired grain orientation and each having a radially inwardly facing second bonding surface adapted to mate with said first bonding surface;

positioning said blade elements accurately relative to one another about the periphery of said disk preform with their second bonding surfaces in mating contact with said preform first bonding surface to form a first group of components, and disposing said group of components within a press;

heating said group of components within said press and simultaneously applying pressure thereto to obtain:

(1) superplastic deformation of said disk preform at the interfaces of said first and second bonding surfaces and (2) a solid state diffusion bond at said interfaces to form an integral assembly; and heat treating said integral assembly to obtain strength and hardness of the materials in said assembly.

5. The method for fabricating an integrally bladed rotor according to claim 4 including, prior to said step of heating said group of components and applying pressure, the step of removing oxygen and moisture from the surfaces to be diffusion bonded.

6. The method for fabricating an integrally bladed rotor according to claim 5 wherein the step of removing oxygen and moisture from the surfaces to be diffusion bonded includes encapsulating said group of components within a can and evacuating said can to at least a vacuum of $10^{-5}$ Torr.

7. The method for fabricating an integrally bladed rotor according to claim 5 wherein said step of heating said group of components and applying pressure comprises hot isostatically pressing said group of components.

8. The method for fabricating an integrally bladed rotor according to claim 5 wherein said press is a forging press, and wherein said step of heating and applying pressure includes forging under isothermal conditions to obtain the said superplastic deformation of said disk preform at said interfaces.

9. The method for fabricating an integrally bladed rotor according to claim 5 wherein the step of fabricating individual blade elements of said first material includes forming each element into an airfoil prior to the step of positioning said elements about said disk preform.

10. The method for fabricating an integrally bladed rotor according to claim 5 including the step of fabricating a plurality of spacers, wherein the step of positioning said blade elements accurately relative to one another about said disk preform includes disposing a spacer between adjacent blade elements, said spacers being a part of said first group of components, said spacers being made from a material which will not plastically deform during said step of heating and applying pressure thereby maintaining the proper position of said blade elements relative to one another and to said disk preform during the step of diffusion bonding.

11. In the method for fabricating an integrally bladed rotor according to claim 4, wherein said bladed rotor is a centrifugal rotor, said disk preform is an impeller disk preform, and said blades are impeller blades, the additional steps of:

fabricating an exducer disk preform having an axis and an axially facing bonding surface, wherein said impeller disk preform also has an axis and an axially facing bonding surface, and said blade elements have axially facing bonding surfaces;

wherein the step of positioning further includes arranging said exducer disk preform coaxially with said impeller disk preform, said exducer disk bonding surface being in mating contact with both said impeller disk preform axially facing bonding surface and said blade elements axially facing bonding surfaces said exducer disk preform being a part of said group of components and being made from a superalloy material which has been processed to be superplastic during the subsequent step of heating and applying pressure; and wherein said step of heating and applying pressure results in a solid state diffusion bond between said axially facing mating bonding surfaces of said impeller disk preform, said exducer disk preform, and said blade elements.

12. The method for fabricating an integrally bladed rotor according to claim 5 including the step of forming airfoils from said blade elements after said step of diffusion bonding said blade elements to said disk preform.

13. The method for fabricating an integrally bladed rotor according to claim 10 wherein the step of positioning said blade elements and spacers about said disk preform includes first forming an annular blade ring by bonding together, alternately, said blade elements and spacers in circumferentially side by side relationship, said blade ring having a radially inward facing bonding surface, and subsequently disposing said bonded blade ring about said disk preform with said blade ring bonding surface in mating contact with said preform first bonding surface.

14. The method for fabricating an integrally bladed rotor according to claim 10 including machining away said spacers after diffusion bonding said blade elements to said disk preform.

15. The method for fabricating an integrally bladed rotor according to claim 5 wherein said first material is a single crystal alloy.

16. The method of fabricating an integrally bladed rotor according to claim 11 including, after the step of heating and applying pressure, the steps of fabricating a plurality of circumferentially spaced apart exducer blades from said exducer disk preform and fabricating a plurality of circumferentially spaced apart impeller blades from said blade elements, one impeller blade corresponding to each of said exducer blades and being diffusion bonded thereto.

17. The method for fabricating an integrally bladed rotor according to claim 16 wherein said step of heat treating comprises heating said integral assembly to a temperature above the gamma prime solvus temperature of the exducer disk preform and impeller disk preform to coarsen the grain structure of both of said preforms.

18. The method for fabricating an integrally bladed rotor according to claim 5 wherein said bladed rotor is a centrifugal rotor, said disk preform of said integral assembly is an impeller disk preform having an axially facing bonding surface, and said blade elements of said integral assembly are impeller blade elements each having an axially facing bonding surface, including, after the step of heating and applying pressure, the additional steps of:
 fabricating an exducer disk preform having an axis and an axially facing bonding surface, said exducer disk preform being made from a superalloy material which has been processed to be superplastic during the subsequent step of heating and applying pressure;
 arranging said exducer disk preform coaxially with said impeller disk preform of said integral assembly such that said exducer disk bonding surface is in mating contact with both said impeller disk preform axially facing bonding surface and said blade element axially facing bonding surfaces; and
 disposing said integral assembly, with the exducer disk preform so arranged thereon, within a press and removing oxygen and moisture from said mating bonding surfaces, and thereafter heating said integral assembly and exducer disk preform within said press and simultaneously applying pressure thereto to obtain
 (1) superplastic deformation of said exducer disk preform at the bonding surface thereof where it mates with said blade element bonding surfaces and said impeller disk bonding surface, and
 (2) a solid state diffusion bond at said mating surfaces such that said exducer disk preform becomes integral with and a part of said integral assembly.

19. The method for fabricating an integrally bladed rotor according to claim 18 wherein said step of heat treating comprises heating said integral assembly to a temperature above the gamma prime solvus temperature of said exducer disk preform and impeller disk preform to coarsen the grain structure of both of said preforms.

20. The method for fabricating an integrally bladed rotor according to claim 19 wherein, after diffusion bonding said exducer disk preform to said impeller disk preform, forming an axially extending core cavity within said integral assembly through said impeller disk preform and exducer disk preform and coaxial therewith, said cavity having a radially inwardly facing bonding surface;
 fabricating a core preform having an axis and a radially outwardly facing bonding surface, said core preform being made from a material which is superplastic during the subsequent step of heating and applying pressure;
 positioning said core preform within said core cavity, said cavity and core preform being configured such that their bonding surfaces are in mating contact, including positioning said integral assembly with said core preform positioned therein within a press and removing oxygen and moisture from the mating bonding surfaces thereof;
 heating said integral assembly and core preform within said press and simultaneously applying pressure thereto to obtain:
 (1) superplastic deformation of said core preform at the bonding surface thereof where it mates with said cavity bonding surface, and
 (2) a solid state diffusion bond at said mating surfaces to form a centrifugal rotor assembly; and
 heat treating said centrifugal rotor assembly to coarsen the grain size of the core preform and to strengthen the rotor assembly.

* * * * *

UNITED STATES PATENT AND TRADEMARK OFFICE
CERTIFICATE OF CORRECTION

PATENT NO. : 4,529,452

DATED : July 16, 1985

INVENTOR(S) : Bryant H. Walker

It is certified that error appears in the above-identified patent and that said Letters Patent is hereby corrected as shown below:

Column 3, line 46: "pressure" should read --pressing--.

Column 6, line 62: "AF2-IDA" should read --AF2-1DA--.

Column 7, line 35: "AF2-IDA" should read --AF2-1DA--.

Column 9, lines 30-31: "AF2-IDA" should read --AF2-1DA--.

Column 9, line 57: "ws" should read --was--.

Column 11, line 42: "concial" should read --conical--.

Column 11, line 50: "withdrawm" should read --withdrawn--.

Column 14, Claim 13, line 55: "inward" should read --inwardly--.

Signed and Sealed this

Twenty-ninth Day of October 1985

[SEAL]

Attest:

DONALD J. QUIGG

Attesting Officer

Commissioner of Patents and Trademarks—Designate